United States Patent [19]

Delius et al.

[11] Patent Number: 5,420,231

[45] Date of Patent: May 30, 1995

[54] AROMATIC COPOLYAMIDES, PROCESS FOR PREPARING THEM AND THEIR USE FOR THE PRODUCTION OF SHAPED STRUCTURES

[75] Inventors: Ulrich M. Delius, Frankfurt am Main; Willi Kreuder; Matthias Wiesner, both of Mainz, all of Germany

[73] Assignee: Hoechst Aktiengesellschaft, Frankfurt am Main, Germany

[21] Appl. No.: 104,083

[22] PCT Filed: Feb. 25, 1992

[86] PCT No.: PCT/EP92/00392

§ 371 Date: Aug. 11, 1993

§ 102(e) Date: Aug. 11, 1993

[87] PCT Pub. No.: WO92/14775

PCT Pub. Date: Sep. 3, 1992

[30] Foreign Application Priority Data

Feb. 26, 1991 [DE] Germany ............... 41 05 950.6

[51] Int. Cl.⁶ ............................................. C08G 69/26
[52] U.S. Cl. ............................................. 528/341
[58] Field of Search ................................. 528/341

[56] References Cited

U.S. PATENT DOCUMENTS 5,077,378 12/1991 Mueller et al. ............... 528/185

FOREIGN PATENT DOCUMENTS 0256606 2/1988 European Pat. Off. .

OTHER PUBLICATIONS

Chemical Abstracts, vol. 83, No. 14, 1975, Columbus, Ohio.

Chemical Abstracts, vol. 75, No. 16, 1971, Columbus, Ohio.

Chemical Abstracts, vol. 75, No. 6, 1971, Columbus, Ohio.

Primary Examiner—John Kight, III
Assistant Examiner—Terressa M. Mosley
Attorney, Agent, or Firm—Curtis, Morris & Safford

[57] ABSTRACT

Aromatic copolyamides, process for preparing them and their use for the production of shaped structures Aromatic copolyamide which is soluble in organic solvents, and a process for its preparation, which contains the recurring structural units (I), (II) and (III)

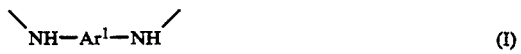

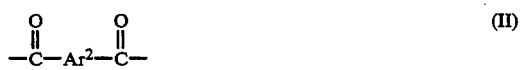

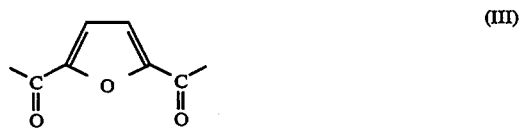

to the extent of at least 90 mol % and 0 to 5 mol % of end groups of the structural units (IV)

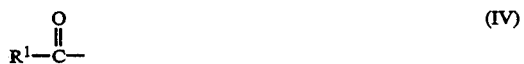

The sum of the molar proportions of (II) and (III) is in the ratio of 0.9:1 to 1.1:1 to the molar proportion of (I), and at the same time the molar proportions of (II) and (III) are in a ratio to one another of 60:40 to 10:90.

The copolyamides are suitable for the production of shaped articles or for coatings and for the production of fibers, membranes and films.

15 Claims, No Drawings

AROMATIC COPOLYAMIDES, PROCESS FOR PREPARING THEM AND THEIR USE FOR THE PRODUCTION OF SHAPED STRUCTURES

DESCRIPTION

Aromatic copolyamides, process for preparing them and their use for the production of shaped structures. This application is a 371 of PCT/EP92/00392 filed Feb. 25, 1992.

Aromatic polyamides are known as materials of high mechanical, chemical and heat stability. Fibers and films of these materials exhibit high strengths and high initial moduli (modulus of elasticity), which renders them particularly suitable for industrial fields of use, for example for reinforcing plastics or as filter materials.

Such polymers are usually prepared by reaction of aromatic diamines with aromatic dicarboxylic acid chlorides in aprotic organic solvents of the amide type, for example N,N-dimethylacetamide (DMAc) or N-methylpyrrolidone (NMP), alkali metal chlorides or alkaline earth metal chlorides being added, if appropriate, to improve the solubility and the hydrogen chloride formed subsequently being neutralized, for example with calcium oxide (DE-A-19 29 713, DE-B-22 19 703).

However, the preparation and processing of such polyamides proves to be very expensive. Because of its poor solubility in organic solvents, even in the presence of organic salts, such as lithium chloride or calcium chloride, as solubilizing agents, the polymer already precipitates out of the reaction medium shortly after its formation. It must be isolated, washed and dried, and then dissolved again in a solvent suitable for the processing.

These polymers are preferably spun from concentrated sulfuric acid, but this causes particular problems in handling (work safety, corrosion) and disposal.

Sparingly soluble polyamides, such as poly(p-phenyleneterephthalamide), have bonds arranged in parallel or coaxially to one another starting from the aromatic units. To achieve better solubility, it is possible to employ comonomers which are intended to serve to interrupt the parallel or coaxial pattern of bonds along the polymer chains.

Aromatic copolyamides of terephthalic acid, p-phenylenediamine and 3,4'-diaminodiphenyl ether can be processed from the NMP solutions obtained during the preparation process to give fibers and films having good strengths. However, synthesis of 3,4'-diaminodiphenyl ether and purification thereof are very expensive because of the asymmetric structure. Modifications of poly(p-phenylene-terephthalamide) which are industrially simpler, for example by incorporation of meta-linkage units (for example m-phenylenediamine) result in a deterioration in the mechanical properties (DE-B-30 07 063).

It is furthermore known that polyamides of p-phenylenediamine and 2,5-furandicarboxylic acid derivatives can be processed from NMP with addition of lithium chloride to give fibers and films (EP-A-0 256 606). In this process, the monomers are polymerized with one another directly in the presence of phosphorous acid triphenyl ester and pyridine. The resulting polymers have intrinsic viscosities of more than 1.5 dl/g (measured at 30° C. in 98% strength sulfuric acid).

An alternative synthesis process for the preparation of poly(p-phenylene-2,5-furandicarboxamide) which is achieved without additions which are ecologically unacceptable or are often regarded as toxic, such as phosphorus compounds or pyridine, is described in Polymer Communications, 26, 246–249 (1985). However, in contrast to the products obtained by a direct polycondensation, the products obtained by this route have considerably lower intrinsic viscosities.

The present invention is therefore based on the object of discovering an aromatic copolyamide which has comparably good mechanical properties to poly(p-phenylene-terephthalamide), has a very good solubility in organic solvents and can be processed directly from these solutions to give high-quality fibers and films; whereby the process for the preparation of these polyamides should be economically and ecologically favorable and readily accessible diamines and dicarboxylic acid derivatives should be employed as starting substances.

The object is achieved by the present invention. The invention relates to an aromatic copolyamide which is soluble in organic solvents and contains the recurring structural units (I), (II) and (III)

  (I)

  (II)

  (III)

to the extent of at least 90 mol % and 0 to 5 mol % of end groups of the structural units (IV)

  (IV)

The symbols $Ar^1$, $Ar^2$ and $R^1$ have the following meaning:

$Ar^1$ is a divalent $C_1$—$C_4$ aromatic radical which is substituted by optionally one or two branched or unbranched $C_1$—$C_4$—alkyl or $C_1$—$C_4$—alkoxy radicals, aryl or aryloxy radicals or is unsubstituted and is optionally bridged by —$SO_2$— or —CO—, the amine groups being on non-adjacent ring carbon atoms, $Ar^2$ is a divalent aromatic radical which is substituted by optionally one or two branched or unbranched $C_1$—$C_4$—alkyl or alkoxy radicals, aryl or aryloxy radicals or $C_1$—$C_6$—perfluoroalkyl or perfluoroalkoxy radicals or by fluorine, chlorine or bromine or is unsubstituted.

$Ar^1$ and $Ar^2$ independently of one another can be identical or different.

$R^1$ is an optionally halogen-substituted $C_1$—$C_{10}$—alkyl group or a radical of the structure (V)

  (V)

in which $R^2$ is hydrogen or halogen or a branched or unbranched alkyl or alkoxy radical or an aryl or aryloxy radical. The sum of the molar proportions of (II) and (III) to the molar proportion of (I) here are in the ratio of 0.9:1 to 1.1:1, the molar proportions of (II) and (III) simultaneously being in a ratio to one another of 60:40 to 10:90.

The following compounds are suitable for the preparation of the copolyamides according to the invention:

a.) diamine derivatives of the formula (VI)

  (VI)

such as, for example,
para-phenylenediamine
2-methyl-para-phenylenediaminebenzidine
3,3'-dimethylbenzidine
naphthylene-2,6-diamine
4,4'-diaminodiphenyl ether
1,4-bis-(4-aminophenoxy)-benzene
1,4-bis- (4-aminophenylisopropyl)-benzene
4,4'-diaminodiphenyl sulfone b.) dicarboxylic acid derivatives of the formula (VII)

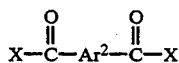  (VII)

in which X is a hydroxyl group or chlorine.

Compounds of the formula (VII) include, for example,
terephthalic acid
terephthalic acid dichloride
isophthalic acid
isophthalic acid dichloride
2-chloroterephthalic acid
2-chloroterephthalic acid chloride
naphthalene-2,6-dicarboxylic acid
naphthalene-2,6-dicarboxylic acid chloride
dicarboxylic acid chlorides preferably being used, and c.) furandicarboxylic acid derivative of the formula (viii)

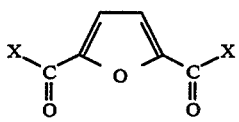  (VIII)

(X has the abovementioned meaning)

Examples of compounds of the formula (VIII) are:
2,5-furandicarboxylic acid and
2,5-furandicarboxylic acid chloride The preparation of the aromatic copolyamides according to the invention is carried out by solution condensation of mixtures of (VII) and (VIII) with (VI) in known polyamide solvents. Polyamide solvents are understood as meaning polar aprotic solvents which contain amide bonds, such as, for example, dimethylacetamide (DMAc), dimethylformamide (DMF) and lactams, such as, for example, N-methylpyrrolidone and N-methylcaprolactam. Components (VII) and (VIII) are in a molar ratio to one another of 60:40 to 10:90 in the process according to the invention, the proportion thereof, based on the proportion of component (VI), being 90 to 110 mol %, preferably 100 mol %. The acid chlorides (VII) and (VIII) are preferably added to the reaction mixture as a homogenous mixture, particularly preferably as a solution of the two components in some of the solvent used for the polycondensation. Components (VI), (VII) and (VIII) are subjected to polycondensation with one another at temperatures in the range from −20° to 120° C. preferably in the range from 0° to 100° C. particularly preferably in the range from 10° to 90° C. If appropriate, halide salts of metals of the first and/or second group of the Periodic Table of the Elements are added to these solvents in a known manner to increase the dissolving capacity or to stabilize the copolyamide solutions. Preferred additives are calcium chloride and/or lithium chloride.

The terminal amino groups of the aromatic copolyamide can be neutralized by addition of a monocarboxylic acid chloride or anhydride of the formula (IX)

  (IX)

in which Y is chlorine or a group

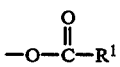

and $R^1$ has the abovementioned meaning. Examples of such chain-terminating agents are benzoyl chloride, fluorobenzoyl chloride, diphenylcarboxylic acid chloride, phenoxybenzoyl chloride, acetic anhydride, chloroacetic anhydride and propionic anhydride.

If appropriate, such chain-terminating agents can be substituted on the aromatic nucleus, preferably by fluorine or chlorine atoms. Benzoyl chloride is preferably employed.

The polycondensation reaction is preferably carried out such that 2 to 20, preferably 5 to 15%, by weight of polycondensate are present in the solution after the reaction has ended.

The amino groups on the ends of the polymer chain are usually neutralized by addition of a monofunctional acid chloride or an acid anhydride of the formula (IX) when the solution of the polymer formed has reached the desired viscosity.

In a preferred embodiment of the preparation process, an at least equivalent amount of one or more acid-binding inorganic or organic additives is added to the reaction mixture to neutralize the hydrogen chloride formed during the reaction. Examples of such additives are alkali metal oxides and hydroxides and alkaline earth metal oxides and hydroxides, for example lithium hydroxide and calcium oxide, and compounds of the formulae (X), (XI) and (XII), such as propylene oxide, ammonia, triethylamine and pyridines, or pyridines which are substituted in the 2-, 3- or 4-position.

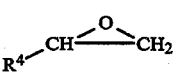  (X)

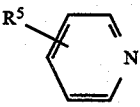  (XI)

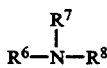

R$^4$, R$^5$, R$^6$, R$^7$ and R$^8$ in compounds of the formulae (X), (XI) and (XII) are identical or different and independently of one another are hydrogen or a branched or unbranched alkyl group, preferably a C$_1$ to C$_3$ alkyl group. In the case where lithiumhydroxide, calcium oxide or ammonia is used, the neutralizing agent is preferably added only after the end of the polycondensation.

In another preferred embodiment, a compound of the formula (VI) and an at least equivalent amount, preferably 100 to 120 mol %, based on (VI), of one of the compounds (X), (XI) or (XII) are subjected to polycondensation with a mixture of (VII) and (VIII) and, when the polycondensation has ended, similarly an at least equivalent amount of an alkali metal oxide or hydroxide or alkaline earth metal oxide or hydroxide is added. In this manner, the acid-binding component (X), (XI), (XII) first added is for the most part liberated again and can be recovered again, for example by distillation.

If appropriate, suitable amounts of additives are added to the solutions. Examples are light stabilizers, antioxidants, flameproofing agents, antistatics, dyestuffs, colored pigments or fillers. To isolate the copolyamides, a precipitating agent can be added to the solutions and the coagulated product can be filtered off. Examples of suitable precipitating agents are: water, preferably with additions of acid, such as hydrochloric acid or acetic acid, mixtures of water and aphrotic solvents, such as DMF, DMAc and NMP, and methanol.

The intrinsic viscosities (=Staudinger Index) of the copolyamides which have been prepared by the process according to the invention are in the range from 1.0 to 5.0 dl/g, preferably in the range from 1.0 to 3.0 dl/g.

Intrinsic viscosity ([η]$_0$) is understood as meaning the following relationship:

$$[\eta]_0 = \lim_{c \to 0} \left( \ln \frac{n\ rel}{c} \right)$$

ηrel=relative viscosity c=concentration of the solution in g/dl

To prepare shaped structures from the copolyamides according to the invention, the resulting solutions are filtered, degassed and processed in a known manner to give filaments, fibers, films, membranes or coatings. For example, fibers can be produced by using a wet spinning unit, where the polymer solution is forced out through suitable nozzles into a precipitating bath and the resulting filaments are drawn through washing baths and stretched at a relatively high temperature. Suitable precipitating baths are aqueous solutions of amide solvents, such as N-methylpyrrolidone, and may also include aqueous salt solutions, such as calcium chloride solutions.

Stretching, in the production of filaments, fibers and films, comprises slight wet stretching and greater contact stretching. For contact stretching, for example, the filaments are drawn over hot plates ("irons") having a surface temperature in the range from 250° C. to 450° C.

EXAMPLES:

The intrinsic viscosities were measured at 25° C. in NMP with addition of 2.0% of lithium bromide.

Example 1

Aromatic copolyamide of 100 mol % of p-phenylenediamine, 50 mol % of 2,5-furandicarboxylic acid chloride and 50 mol % of terephthalic acid dichloride.

A solution of 13.52 g of p-phenylenediamine (0.125 mol) and 9.2 g of lithium chloride in 175 ml of N-methylpyrrolidone (NMP) and 34.95 g of 2-picoline was initially introduced into a reaction vessel of 300 ml capacity. A solution of 12.15 g of 2,5-furandicarboxylic acid dichloride (0.063 mol) and 12.79 g of terephthalic acid dichloride (0.063 mol) in 44 ml of NMP was added at a temperature of +5° C., while stirring and blanketing with a layer of N$_2$. All the substances had been carefully purified and dried beforehand. The mixture was heated to 70° C. in the course of 30 minutes, while stirring, and subjected to after-condensation at this temperature for 120 minutes. 0.7 g of benzoyl chloride (0.005 mol) was then added and the mixture was stirred for a further 30 minutes. The resulting solution was filtered and added dropwise to an excess of 2% strength hydrochloric acid. The polymer which had precipitated was washed 4 times with water heated to 70° C. and 3 times with acetone and dried in vacuo at 120° C. for 24 hours. The intrinsic viscosity was 2.05.

Example 2

Aromatic copolyamide of 100 mol % of p-phenylenediamine, 65 mol % of 2,5-furandicarboxylic acid chloride and 35 mol % of terephthalic acid dichloride.

The polycondensation according to Example 1 was repeated with the difference that a solution of 15.99 g of furandicarboxylic acid chloride (0.083 mol) and 9.06 g of terephthalic acid chloride (0.045 mol) in 43 ml of NMP was used instead of the abovementioned solution of these compounds. The intrinsic viscosity of the polymer was 1.25.

Example 3

Aromatic copolyamide of 100 mol % of p-phenylenediamine, 85 mol % of 2,5-furandicarboxylic acid chloride and 5 mol % of terephthalic acid dichloride.

A solution of 108.1 g of p-phenylenediamine (1.0 mol) and 73.6 g of lithium chloride in 1400 ml of NMP and 279.4 g of 2-methylpyridine (3.0 mol) was initially introduced into a reaction vessel of 3 l capacity. A solution of 16.60 g of furandicarboxylic acid chloride (0.86 mol) and 31.1 g of terephthalic acid dichloride (0.153 mol) in 327 ml of N-methylpyrrolidone was added at a temperature of 5° C. in a nitrogen atmosphere, while stirring. All the components had been carefully purified and dried beforehand. The mixture was heated to 70° C. in the course of 20 minutes, while stirring and blanketing with a layer of nitrogen, and subjected to after-condensation at this temperature for 90 minutes. 5.6 g of benzoyl chloride (0.04 mol) were then added. After a further reaction time of 30 minutes, the polymer was isolated from the resulting solution as described under Example 1. The intrinsic viscosity was 1.06.

Example 4

Aromatic copolyamide of 100 mol % of p-phenylenediamine, 50 mol % of 2,5-furandicarboxylic acid dichloride and 50 mol % of terephthalic acid dichloride.

A solution of 81.1 g of p-phenylenediamine (0.75 mol) and 81 g of lithium chloride in 2000 ml of N-methylpyrrolidone (NMP) was initially introduced into a reaction vessel of 3 l capacity. A solution of 72.37 g of 2,5-furandicarboxylic acid dichloride (0.375 mol) and 76.13 g of terephthalic acid dichloride (0.375 mol) in 200 g of NMP was added at a temperature of 5° C., in a nitrogen atmosphere, while stirring.

The mixture was heated to 70° C. in the course of 60 minutes, while stirring and blanketing with a layer of nitrogen, and subjected to further condensation at this temperature for 90 minutes. 5.6 g of benzoyl chloride (0.04 mol) were then added, and a suspension of 49.1 g of calcium oxide (0.90 mol) in 30 ml of NMP was added after a further 20 minutes. The mixture was subsequently stirred at 70° C. for 20 minutes, filtered and degassed. The resulting solution contained 6.6% by weight of copolyamide, 3.05% by weight of lithium chloride and 3.13% of calcium chloride.

A portion of the solution was added dropwise to an excess of water. The polymer which had precipitated was washed 4 times with water heated to 70° C. and 3 times with acetone and dried in vacuo at 120° C. for 24 hours. The intrinsic viscosity was 2.71.

The remainder of the solution was wet-spun to fibers. For this, it was spun from a nozzle with 100 openings of 0.06 mm each into a horizontally positioned coagulation bath comprising a solution, heated to 73° C. of NMP in water, at a rate of 16.0 m/minute. The resulting filaments were drawn off through two water baths, a washing machine, over a drying godet at 178° C. and finally over an iron at 407° C. at a rate of 42 m/minute.

The individual filament titer was 0.36 dtex (DIN 53830) and the breaking force, based on fineness, was 26 cN/tex at a breaking force elongation of 1.1% (DIN 53834, part 1).

The initial modulus was 28 N/tex. It was determined from the gradient of the stress-strain diagramat between 0.3 and 0.5 % elongation.

Comparison Example 1

Aromatic polyamide of 100 mol % of p-phenylenediamine and 100 mol % of 2,5-furandicarboxylic acid chloride.

The polycondensation according to Example 1 was repeated, but with the difference that a solution of 24.12 g of furandicarboxylic acid dichloride (0.125 mol) in 37 ml of N-methylpyrrolidone was used instead of the solution of the mixture of furandicarboxylic acid dichloride and terephthalic acid dichloride. The intrinsic viscosity of the polymer was only 0.49.

Comparison Example 2

Aromatic polyamide of 100 mol % of p-phenylenediamine and 100 mol % of 2,5-furandicarboxylic acid by direct polycondensation with triphenyl phosphite and 3-methylpyridine.

12.98 g of p-phenylenediamine (0.120 mol), 19.27 g of furandicarboxylic acid (0.123 mol) and 82 g of triphenyl phosphite (0.264 mol) were initially introduced into a reaction vessel of 2 l capacity. 134 g of 2-methylpyridine (1.44 mol) and 600 ml of NMP, in which 9.2 g of lithium chloride and 35 g of calcium chloride had been dissolved beforehand, were added under a nitrogen atmosphere. All the substances had been carefully purified and dried beforehand. The mixture was heated at 90° C. for 35 hours, while stirring. After the resulting solution had been obtained, it was stirred into 6 l of 2% strength hydrochloric acid. The polymer which had precipitated was washed 4 times with water heated to 70° C. and 3 times with acetone and dried in vacuo at 120° C. for 24 hours. The intrinsic viscosity was only 0.33.

Comparison Example 3

Aromatic copolyamide of 100 mol % of p-phenylenediamine, 15 mol % of 2,5-furandicarboxylic acid chloride and 85 mol % of terephthalic acid dichloride.

The polycondensation according to Example 1 was repeated with the difference that 3.69 g of 2,5-furandicarboxylic acid chloride (0.019 mol) and 21.60 g of terephthalic acid dichloride (0.016 mol) were employed. In contrast to Example 1, the reaction mixture did not form a clear solution but a yellow pasty slurry. After the temperature had been increased to 80° C., the amount of lithium chloride in the mixture was increased by 14.55 g (9.5% by weight in total, based on NMP). A slurry of undissolved material was then still present. The reaction mixture was stirred into an excess of 2% strength hydrochloric acid. The resulting solid was further treated as described under Example 1. Measurement of the intrinsic viscosity gave a value of only 0.2.

We claim:

1. An aromatic copolyamide which has an intrinsic viscosity in the range from 1.0 to 5.0 dl/g measured at 25° C. in NMP and which is soluble in organic solvents and which contains no hydroxyl groups, consisting essentially of the recurring structural units (I), (II) and (III)

(I)

(II)

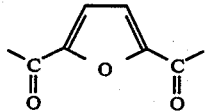
(III)

to the extent of at least 90 mol % and 0 to 5 mol % of end groups of the structural units (IV)

(IV)

in which the symbols $Ar^1$, $Ar^2$ and $R^1$ have the following meaning:

$Ar^1$ is a divalent aromatic radical which is substituted by optionally one or two branched or unbranched $C_1$ to $C_4$ alkyl or alkoxy radicals, aryl or aryloxy radicals or is unsubstituted and is optionally bridged by —$SO_2$— or —CO—, the amine groups being on non-adjacent ring carbon atoms;

$Ar^2$ is a divalent aromatic radical which is substituted by optionally one or two branched or unbranched $C_1$—$C_4$ alkyl or $C_1$—$C_4$ alkoxy radicals, aryl or aryloxy radicals or $C_1$ to $C_6$ perfluoroalkyl or perfluoroalkoxy radicals or by fluorine, chlorine, bromine or iodine or is unsubstituted in which $Ar^1$ and $Ar^2$ are identical or different and independent of one another, and $R^1$ is an optionally halogen-substituted $C_1$ to $C_{10}$ alkyl group or a radical of the structure (V)

 (V)

in which $R^2$ is hydrogen or halogen or a branched or unbranched alkyl or alkoxy radical or an aryl or aryloxy radical and the sum of the molar proportions of (II) and (III) to the molar proportion of (I) are in the ratio of 0.9:1 to 1.1:1, the molar proportions of (II) and (III) simultaneously being in a ratio to one another of 60:40 to 10:90.

2. An aromatic copolyamide as claimed in claim 1, which contains units which are derived from terephthalic acid and/or isophthalic acid as structural unit II.

3. An aromatic copolyamide as claimed in claim 1, which contains units which are derived from a substituted or unsubstituted phenylenediamine as structural unit I.

4. A process for the preparation of an aromatic copolyamide as claimed in claim 1, which comprises subjecting components (VI), (VII) and (VIII)

 (VI)

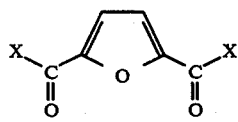 (VIII)

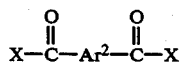 (VII)

which $Ar^1$ and $Ar^2$ have the meaning given in claim 1 and X is a chlorine atom or a hydroxyl group, to polycondensation with one another in an organic solvent at a temperature in the range from −20° to 120° C., components (VII) and (VIII) being in a molar ratio to one another of 60:40 to 10:90 and the proportion thereof, based on the proportion of component (VI), being 90 to 110 mol %.

5. The process as claimed in claim 4, wherein the terminal amino groups of the aromatic copolyamide are neutralized by addition of a monocarboxylic acid chloride or anhydride of the formula (IX)

 (IX)

in which Y is chlorine or a group —OC—$R^1$ and $R^1$ has the abovementioned meaning.

6. The process as claimed in claim 5, wherein the monocarboxylic acid chloride or anhydride of the formula (IX) is added in a concentration in the range from 0 to 5 mol %, based on the aromatic copolyamide.

7. The process as claimed in claim 4, wherein a halide salt of a metal of the first and/or second group of the Periodic Table of the Elements is added to the reaction solution to increase the solubility.

8. The process as claimed in claim 4, wherein the organic solvent employed is one which contains amide bonds.

9. The process as claimed in claim 4, wherein an alkali metal oxide or hydroxide or alkaline earth metal oxide or hydroxide or a compound of the formula (X), (XI) or (XII)

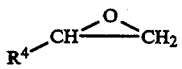 (X)

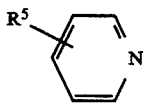 (XI)

 (XII)

in which $R^4$, $R^5$, $R^6$, $R^7$ and $R^8$ are identical or different and independently of one another are hydrogen or a branched or unbranched alkyl group, is added to the reaction solution as an acid-binding additive.

10. The process as claimed in claim 9, wherein the acid-binding additive is added to a solution of (VI) in a polyamide solvent and this solution is then subjected to polycondensation with components (VII) and (VIII).

11. The process as claimed in claim 4 or 10, wherein an acid-binding additive, is added after the end of the polycondensation.

12. The process as claimed in claim 8, wherein the organic solvent is dimethylacetamide, N-methyl-pyrrolidone, dimethyl formamide or N-methylcaprolactam.

13. The process as claimed in claim 11, wherein the acid-binding additive is lithium hydroxide or calcium oxide.

14. A shaped article or coating comprising a copolyamide as recited in claim 1.

15. A fiber, membrane or film comprising a copolyamide as recited in claim 1.

* * * * *